US012737397B2

(12) United States Patent
Noorizadeh et al.

(10) Patent No.: US 12,737,397 B2
(45) Date of Patent: Sep. 15, 2026

(54) DYNAMIC RESPONSE ENGINE

(71) Applicant: Bank of America Corporation, Charlotte, NC (US)

(72) Inventors: Emad Noorizadeh, Plano, TX (US); Chris Welles, Charlotte, NC (US); Rajan Jhaveri, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/043,589

(22) Filed: Feb. 3, 2025

(65) Prior Publication Data

US 2025/0181615 A1 Jun. 5, 2025

Related U.S. Application Data

(62) Division of application No. 18/198,969, filed on May 18, 2023, now Pat. No. 12,248,500.

(51) Int. Cl.
*G06F 16/3329* (2025.01)

(52) U.S. Cl.
CPC ................................ *G06F 16/3329* (2019.01)

(58) Field of Classification Search
CPC .................................................. G06F 16/3329
See application file for complete search history.

(56) References Cited

U.S. PATENT DOCUMENTS 6,829,603 B1 * 12/2004 Chai .................. G06F 16/3344 707/999.005
12,099,816 B2 9/2024 Jalaluddin et al.
2021/0249002 A1 * 8/2021 Ahmadidaneshashtiani ................ H04L 51/02 707/737
2022/0059085 A1 2/2022 Thomas et al.
2022/0165267 A1 * 5/2022 Lee ......................... G10L 15/22 707/999.005
2023/0050511 A1 * 2/2023 Michelsen ............. G06Q 10/10 707/999.005
2023/0063603 A1 * 3/2023 Matsuoka ............ H04L 51/212 707/999.005
2024/0104624 A1 3/2024 Han et al.
2024/0184829 A1 6/2024 Roy et al.
2024/0185001 A1 * 6/2024 Nagaraju ............. G06F 40/284 707/999.005

(Continued)

*Primary Examiner* — Yuk Ting Choi

(74) *Attorney, Agent, or Firm* — Weiss & Arons LLP

(57) ABSTRACT

A hybrid system for natural language processing is provided. The system may include a transceiver operable to receive a query from a user. The query may include a stock portion integrated with a set of real-time conditions specific to the user. The transceiver may transmit the query to a model and to a response application. The model may receive the query and communicate with a data store. Based on historical data stored at the data store, the model may separate the stock portion from the set of real-time conditions, formulate a response to the stock portion and insert placeholders into the response for responses to the real-time conditions portion. The response application may receive the query and the response. The response application may communicate with private data stores to formulate responsive elements for the placeholders. The response application may insert the responsive elements into the placeholders to complete the response.

6 Claims, 5 Drawing Sheets

(56) References Cited

U.S. PATENT DOCUMENTS

| | | | | |
|---|---|---|---|---|
| 2024/0303496 | A1* | 9/2024 | Nair | G06N 3/0895<br>707/999.005 |
| 2025/0181615 | A1* | 6/2025 | Noorizadeh | G06F 16/3329<br>707/999.005 |

* cited by examiner

DYNAMIC RESPONSE ENGINE

CROSS-REFERENCE TO RELATED APPLICATION

This application is a divisional of U.S. patent application Ser. No. 18/198,969 filed on May 18, 2023, and entitled "DYNAMIC RESPONSE ENGINE" which is hereby incorporated by reference herein in its entirety.

FIELD OF TECHNOLOGY

Aspects of the disclosure relate to large language models.

BACKGROUND OF THE DISCLOSURE

A large language model ("LLM") may be a type of artificial intelligence algorithm and/or model that uses neural networks with many parameters, trained on massively large data sets to understand, summarize, generate and predict responses. Typically, the number of parameters in a large language model may have a parameter count of over one billion. Small data stores may be less than one billion parameters. LLMs may be general purpose models and may excel at a wide range of tasks. LLMs conventionally rely on a fixed knowledge base to perform the requested tasks.

It should be noted that LLMs may incur difficulties when attempting to generate a response for a specific task which is relevant to a specific user and time. Specifically, because the LLMs are general purpose models, there may be difficulties when attempting to harness their capabilities for nuanced, specific and real-time tasks. Even the most recently developed LLMs have difficulty with such tasks.

However, because of their wide range of knowledge it would be desirable to utilize such LLMs to generate responses in nuanced, specific and real-time interactions. Therefore, a hybrid solution may be provided. It would be desirable for the hybrid solution to utilize an LLM to generate a template for response. It would be further desirable for the hybrid solution to pass the templated response from the LLM to a response engine generator. It would be further desirable for the response engine generator to rely on a smaller, more specific, real-time data store to appropriately fill in the variables left incomplete by the LLM. As such, it would be yet further desirable for the hybrid solution to harness the capabilities of an LLM as well as the capabilities of a machine learning, dynamic response application.

SUMMARY OF THE DISCLOSURE

Apparatus and methods for using a hybrid natural language processing system for outputting a customized response to a natural language formatted query may be provided. The methods may include receiving, at a large language model, a natural language formatted query. The natural language formatted query may include a set of real-time conditions.

The large language model may be an artificial intelligence algorithm and/or model that uses one or more neural networks with a plurality of parameters, trained on one or more large data stores to understand, summarize, generate and predict responses. It should be noted that the one or more large data stores may be periodically updated and therefore the large language model may be able to formulate standard responses as opposed to specific responses. The large data stores may be a fixed knowledge base that is updated periodically.

The methods may include processing, at the large language model, the natural language formatted query. The processing may include separating the natural language formatted query into two portions. A first portion may correspond to a stock portion of the query. A second portion may correspond to a set of real-time conditions of the query. The large language model may be able to use the information included in the large data stores to formulate a natural language formatted response template. The natural language formatted response template may be responsive to the first portion of the query. However, the natural language formatted response template may not be responsive to the second portion of the query. As such, processing may include inserting one or more placeholders into the natural language formatted response template. The one or more placeholders may be for receipt of data responsive to the second portion of the query (data responsive to the set of real-time conditions).

The methods may include outputting, at the large language model, a natural language formatted response template. The template may include a natural language formatted response to the first portion of the query as well as one or more placeholders for data responsive to the set of real-time conditions.

The methods may include receiving, at a dynamic, machine learning response application, the natural language formatted query and the natural language formatted response template.

The methods may include processing, using the dynamic, machine learning response application, the natural language formatted query and the natural language formatted response template. The processing may include identifying one or more user accounts included in the set of real-time conditions. The processing may include retrieving user account information from one or more private data stores. The one or more private data stores may be continually updated in real-time. For example, the private data stores may be bank account data stores. Bank account data stores may store data relating to the user's financial information. Such data stores may be updated in real-time.

The methods may include inputting, using the dynamic machine learning response application, the natural language formatted query and the natural language formatted response template. The methods may include outputting, using the dynamic, machine learning response application, a natural language formatted query response customized for the set of real-time conditions.

The method may include displaying the natural language formatted query response. The displaying may be executed before or after the inputting. As such, the displaying may include displaying both the natural language formatted query response and the natural language formatted response template. The displaying may be executed on one or more hardware displays, such as a hardware display operating on a computing device, smartphone, tablet or any other suitable device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
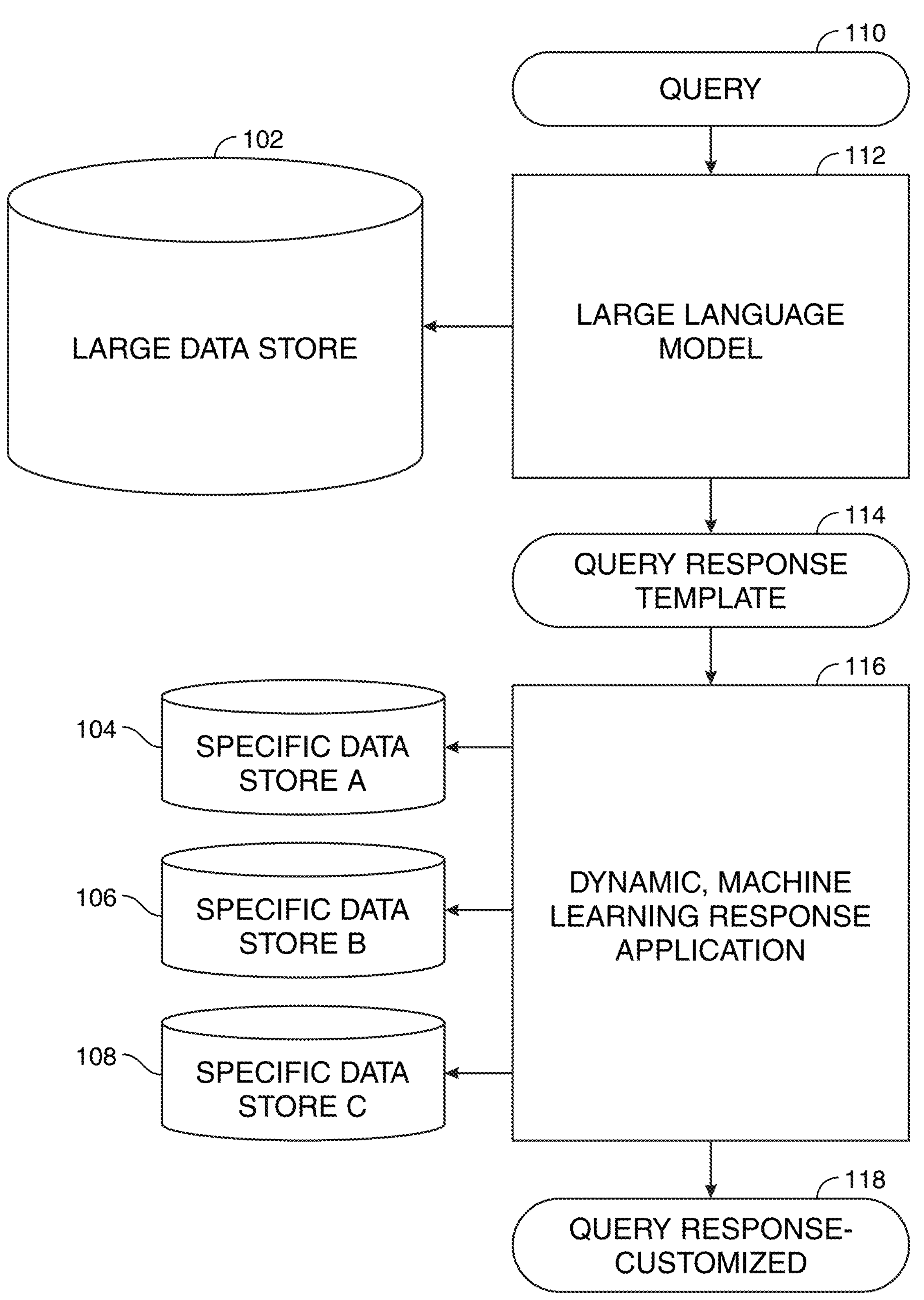
FIG. 1 shows an illustrative diagram in accordance with principles of the disclosure.

Apparatus and methods for a hybrid system for natural language processing is provided. The system may include a transceiver. The transceiver may be operable to receive a natural language formatted query. The natural language formatted query may be received as voice input, textual input and/or any other suitable input.

Voice input may be received via an interactive voice response system. As such, the transceiver and a responder unit may be units within the voice response system. The transceiver may be operable to transcribe the query in the event that the query was received as voice input. The transcribed query may be ingestible by a large language model.

Textual input may be received via a chatbot. As such, the transceiver and a responder may be units within an interactive textual response system.

The natural language formatted query may include a stock portion of the query and a set of real-time conditions portion of the query. The transceiver may be operable to transmit the natural language formatted query to a large language model and to a dynamic, machine learning response application.

The system may include a large language model. The large language model may be an artificial intelligence algorithm and/or model that users one or more neural networks with a plurality of parameters trained on or more large data stores to understand, summarize, generate and predict responses. The large language model may be operable to receive the natural language formatted query. The large language model may be operable to communicate with a large data store and, based on historical data stored at the large data store, formulate a natural language formatted response to the stock portion of the query. The large language model may be operable to insert one or more placeholders into the natural language formatted response for responses to the set of real-time conditions portion of the query.

The system may include a dynamic, machine learning response application. The dynamic, machine learning response application may be operable to receive the natural language formatted query and the natural language formatted response. The dynamic, machine learning response application may be operable to communicate with one or more private data stores and, based on real-time data stored at the one or more private data stores, formulate a real-time responsive element for each of the one or more placeholders included in the natural language formatted response. The dynamic, machine learning response application may be operable to insert the real-time responsive element into each of the one or more placeholders included in the natural language formatted response. The dynamic, machine learning response application may be operable to transmit the natural language formatted response to a responder.

The system may include a responder. The responder may be operable to respond with the natural language formatted response. In some embodiments, the responder may be a graphical user interface ("GUI"). As such, the natural language formatted response may be formatted as a textual response. In certain embodiments, the responder may be an interactive voice response system. As such, the natural language formatted response may be formatted as an audio response.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows a schematic diagram of a dynamic response generator. The dynamic response generator may be a unit included in a computing system. The dynamic response generator may be operable to respond to, and or generate response to, queries transmitted by users.

The dynamic response generator may receive query 110. Query 110 may be received at an interactive voice response system, chatbot, receiver, transceiver or any other suitable receiving unit.

The dynamic response generator may process query 110 at large language model 112. Large language model 112 may communicate with large data store 102. Large language model 112 may be operable to prepare a natural language response to query 110. Because large language model 112 is trained on a large data set, such as large data store 102, large language model 112 may prepare a human-sounding and human-understandable response. However, large language model 112 may not have access to real-time data specific to a user. As such, large language model 112 may not be able to formulate accurate responses to specific conditions asked by the user. Therefore, large language model 112 may produce query response template 114.

Query response template 114 may be a natural language response to query 110. However, for specific conditions requested by the user, query response template 114 may include placeholders. Placeholders may be empty spaces, computer-coded fill-in spaces or any other suitable placeholders. The placeholders may be displayable on a display as question marks, a blank line or any other suitable placeholder displays.

Query response template 114 may be forwarded to dynamic, machine learning response application 116. Dynamic, machine learning response application 116 may have access to specific data store A, shown at 104, specific data store B, shown at 106 and specific data store C, shown at 108. Each of specific data stores A, B and C may be proprietary and/or private data stores. As such, only an authorized requestor may have access to such data stores. Dynamic, machine learning response application 116 may be able to identify the placeholders within query response template 114 and retrieve data, from the specific data stores, to complete each of the placeholders. Dynamic, machine learning response application 116 may incorporate the data into the placeholders within the template and formulate customized query response 118. Customized query response may be specific for the user and have the natural language clarity and finesse associated with large language models.

Figure 2:
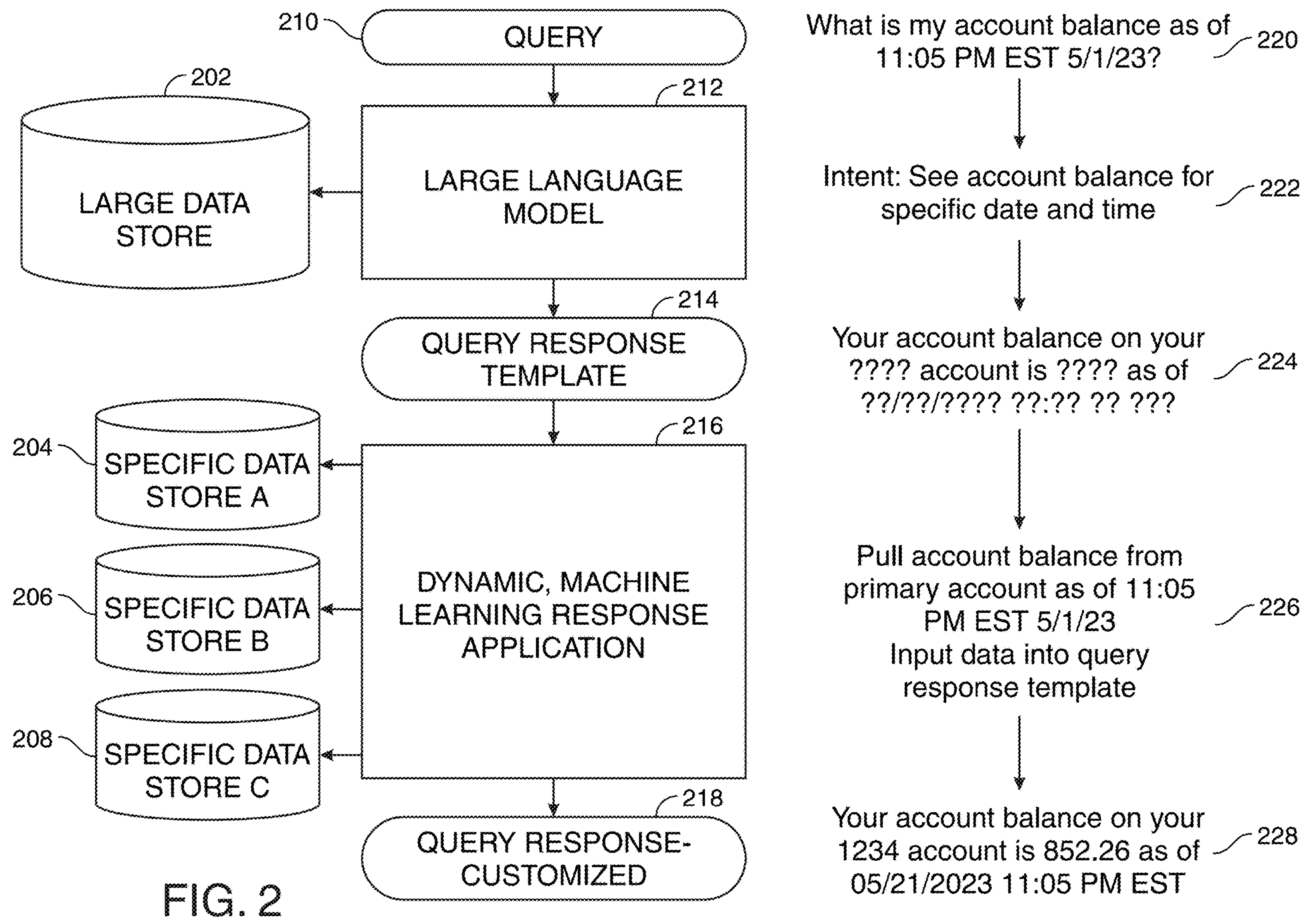
FIG. 2 shows another illustrative diagram in accordance with principles of the disclosure.

FIG. 2 shows an illustrative diagram. Elements 202 through 218 may show a dynamic response generator as shown in FIG. 1. Elements 220, 222, 224, 226 and 228 may correspond to an exemplary query, how the exemplary query is processed through the dynamic response generator and an exemplary customized query response.

Element 220 shows an exemplary query: What is my account balance as of 11:05 PM EST May 1, 2023. The text of the exemplary query may be received at an interactive voice response system, a chatbot or any other suitable system. It should be noted that a receiving system may be able to identify and/or authenticate the query transmitter prior to formulating a response. As such, the receiving system may identify the user account behind the term my within the query. Such information, including the user account, may be included as metadata and may be transmitted to the dynamic response generator as query metadata.

The exemplary query may be transmitted to large language model 212. Large language model 212 may identify, by communicating with large data store 202, an intent of the exemplary query. The identified intent may be See account balance for specific date and time, as shown at 222. Once the intent has been identified, a query response template 214 may be generated. The query response template may be Your account balance on your???? account is ???? as of ??/??/?? ??:?? ???, as shown at 224. The query response template may include question marks as placeholders. Any suitable placeholders may be used and/or any suitable placeholders may be displayed to a user.

The query response template may be transferred to dynamic, machine learning response application 216. Dynamic, machine learning response application 216 may pull account balance from primary account associated with the user as of 11:05 PM EST May 1, 2023, as shown at 226. Dynamic, machine learning response application 216 may also include data into query response template, as shown at 226. Dynamic, machine learning response application 216 may utilize the query response template, the query and/or associated metadata to identify data to input into each of the placeholders.

Dynamic, machine learning response application 216 may generate a customized query response 218. The customized query response may include the inputted data into each of the placeholders of the query response template. The customized query response may be Your account balance on your 1234 account is 852.26 as of May 21, 2023 11:05 PM EST, as shown at 228.

Figure 3:
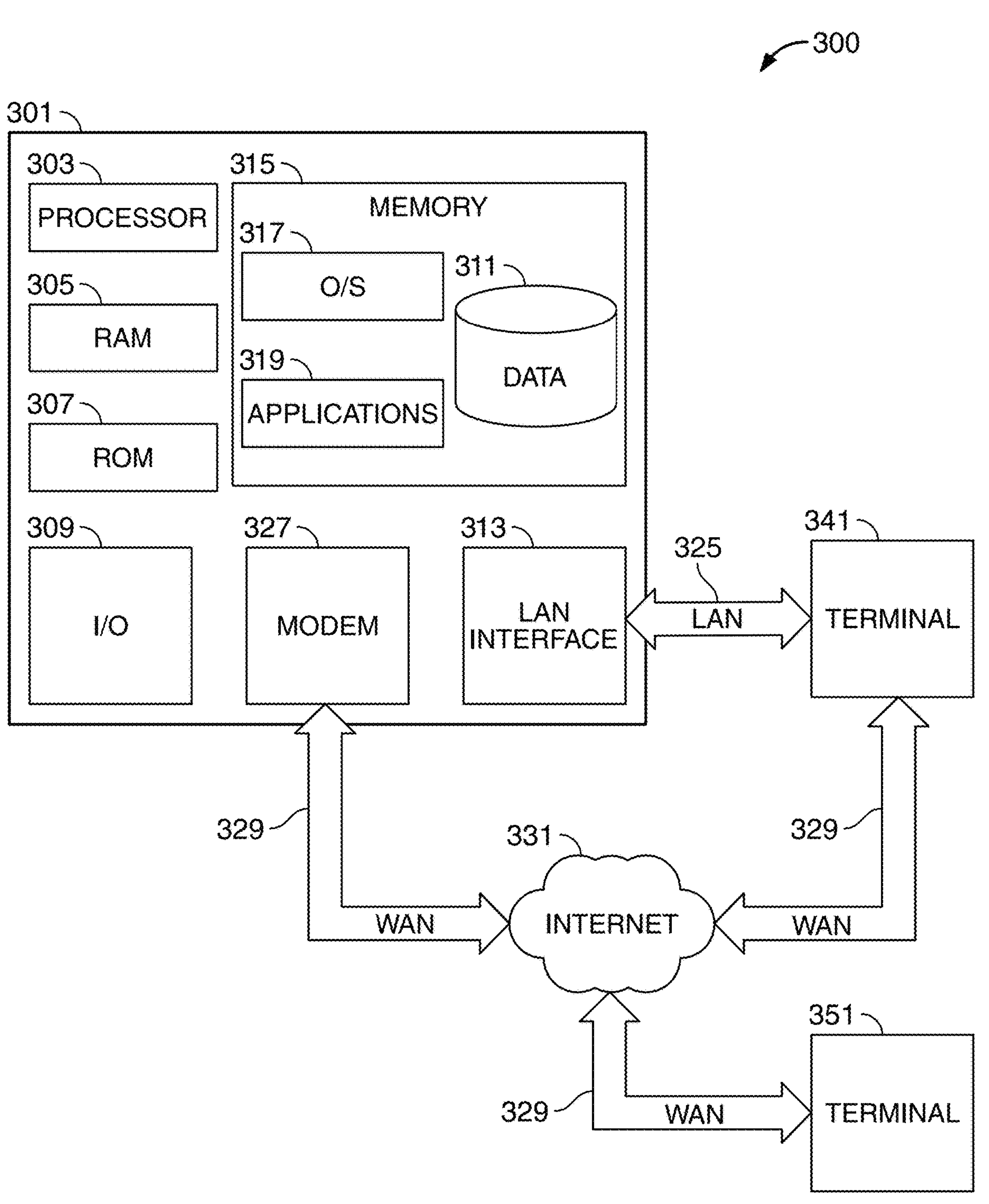
FIG. 3 shows still another illustrative diagram in accordance with principles of the disclosure.

FIG. 3 shows an illustrative block diagram of system 300 that includes computer 301. Computer 301 may alternatively be referred to herein as a "server" or a "computing device." Computer 301 may be a workstation, desktop, laptop, tablet, smart phone, or any other suitable computing device. Elements of system 300, including computer 301, may be used to implement various aspects of the systems and methods disclosed herein.

Computer 301 may have a processor 303 for controlling the operation of the device and its associated components, and may include RAM 305, ROM 307, input/output module 309, and a memory 315. The processor 303 may also execute all software running on the computer—e.g., the operating system and/or voice recognition software. Other components commonly used for computers, such as EEPROM or Flash memory or any other suitable components, may also be part of the computer 301.

The memory 315 may comprise any suitable permanent storage technology—e.g., a hard drive. Memory 315 may store software including the operating system 317 and application(s) 319 along with any data 311 needed for the operation of the system 300. Memory 315 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 301 may execute the instructions embodied by the software to perform various functions.

Input/output ("I/O") module may include connectivity to a microphone, keyboard, touch screen, mouse, and/or stylus through which a user of computer 301 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 300 may be connected to other systems via a local area network (LAN) interface 313.

System 300 may operate in a networked environment supporting connections to one or more remote computers, such as terminals 341 and 351. Terminals 341 and 351 may be personal computers or servers that include many or all of the elements described above relative to system 300. The network connections depicted in FIG. 3 include a local area network (LAN) 325 and a wide area network (WAN) 329, but may also include other networks. When used in a LAN networking environment, computer 301 is connected to LAN 325 through a LAN interface or adapter 313. When used in a WAN networking environment, computer 301 may include a modem 327 or other means for establishing communications over WAN 329, such as Internet 331.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 319, which may be used by computer 301, may include computer executable instructions for invoking user functionality related to communication, such as e-mail, Short Message Service (SMS), and voice input and speech recognition applications. Application program(s) 319 (which may be alternatively referred to herein as "plugins," "applications," or "apps") may include computer executable instructions for invoking user functionality related to performing various tasks. The various tasks may be related to transaction pattern tracking and prediction.

Computer 301 and/or terminals 341 and 351 may also be devices including various other components, such as a battery, speaker, and/or antennas (not shown).

Terminal 351 and/or terminal 341 may be portable devices such as a laptop, cell phone, Blackberry™, tablet, smartphone, or any other suitable device for receiving, storing, transmitting and/or displaying relevant information. Terminals 351 and/or terminal 341 may be other devices. These devices may be identical to system 300 or different. The differences may be related to hardware components and/or software components.

Any information described above in connection with database 311, and any other suitable information, may be stored in memory 315. One or more of applications 319 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 4:
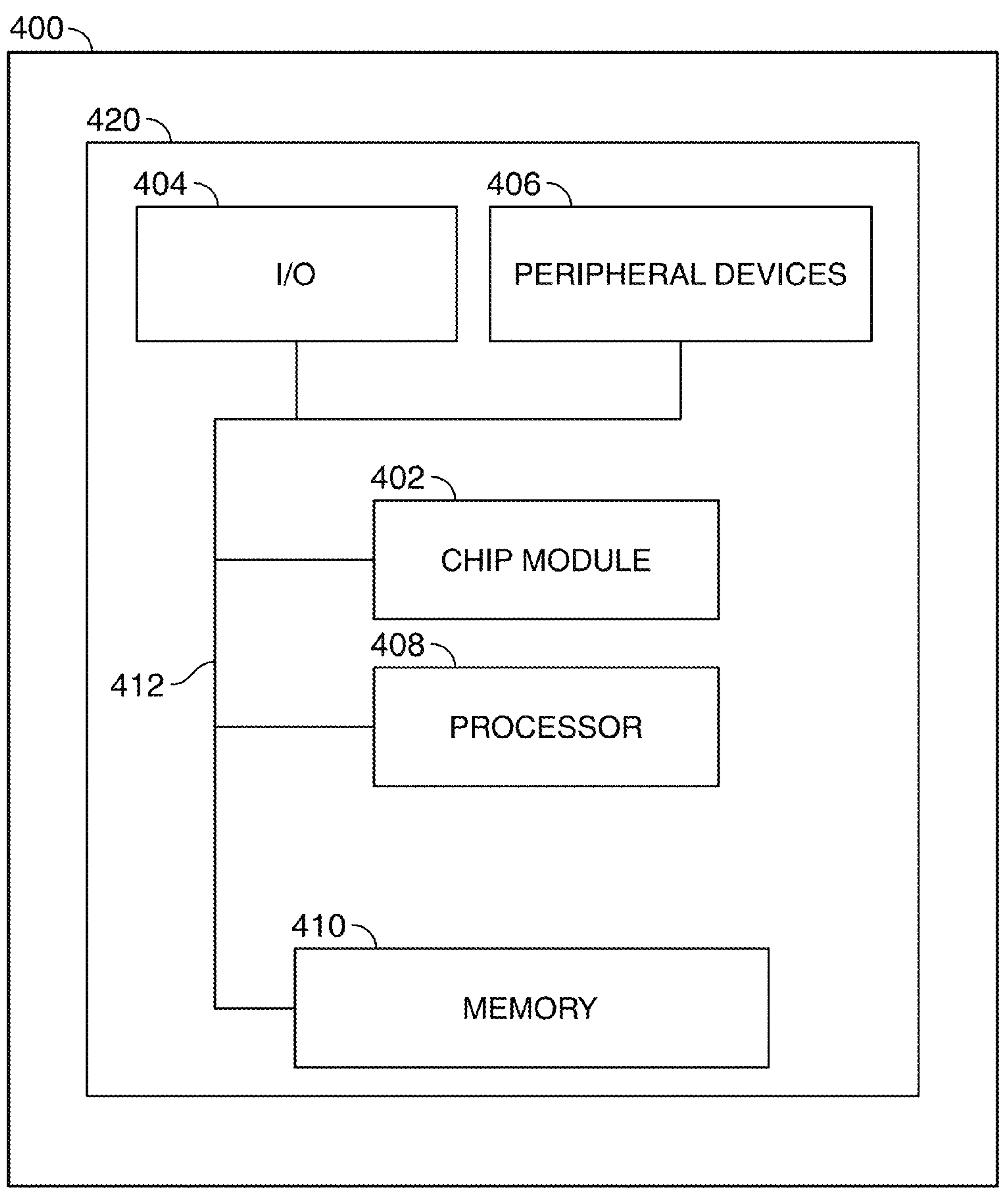
FIG. 4 shows yet another illustrative diagram in accordance with principles of the disclosure.

FIG. 4 shows illustrative apparatus 400 that may be configured in accordance with the principles of the disclosure. Apparatus 400 may be a computing machine. Apparatus 400 may include one or more features of the apparatus shown in FIG. 3. Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data; and machine-readable memory 410.

Machine-readable memory 410 may be configured to store in machine-readable data structures: machine executable instructions (which may be alternatively referred to herein as "computer instructions" or "computer code"), applications, signals, and/or any other suitable information or data structures.

Components 402, 404, 406, 408 and 410 may be coupled together by a system bus or other interconnections 412 and may be present on one or more circuit boards such as 420. In some embodiments, the components may be integrated into a single chip. The chip may be silicon-based.

Figure 5:
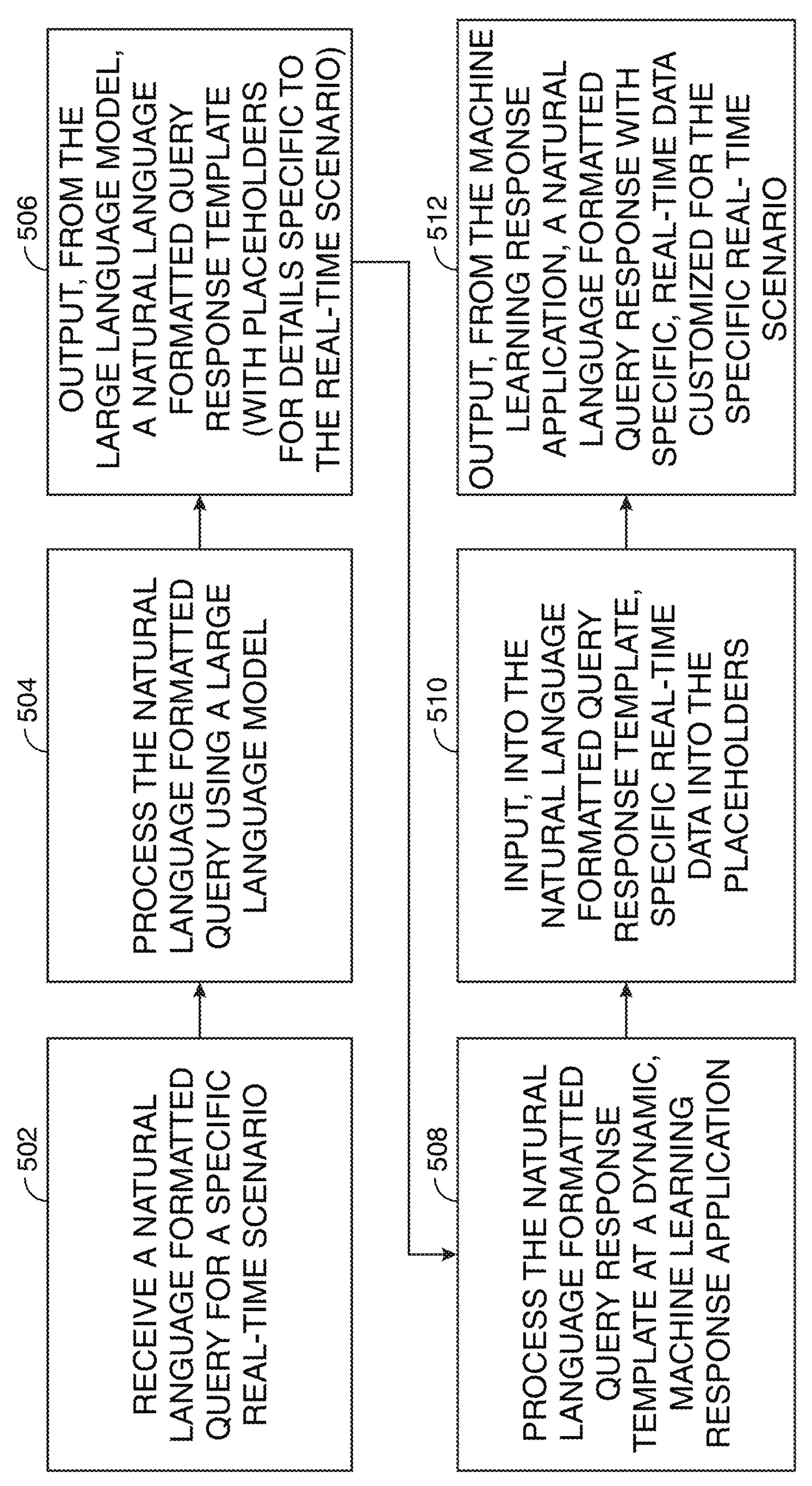
FIG. 5 shows an illustrative flow chart in accordance with principles of the disclosure.

FIG. 5 shows an illustrative flow chart. Step 502 shows a dynamic response generator may receive a natural language formatted query for a specific, real-time scenario.

Step 504 shows a dynamic response generator may process the natural-language formatted query using a large language model.

Step 506 shows a dynamic response generator may output, from the large language model, a natural language formatted query response template. The template may include placeholders for details specific to the real-time scenario.

Step 508 shows a dynamic response generator may process natural language formatted query response template at a dynamic, machine learning response application.

Step 510 shows a dynamic response generator may input, into the natural language formatted query response template, specific real-time data not the placeholders.

Step 512 shows a dynamic response generator may output, from the machine learning response application, a natural language formatted query response with specific, real-time data customized for the specific real-time scenario.

Thus, systems and methods for a dynamic response engine are provided. Persons skilled in the art will appreciate that the present invention can be practiced by other than the described embodiments, which are presented for purposes of illustration rather than of limitation. The present invention is limited only by the claims that follow.

What is claimed is:

1. A method for using a hybrid natural language processing system for outputting a customized response to a natural language formatted query, the method comprising:

- receiving, at a large language model, a natural language formatted query comprising a stock portion and a set of real-time conditions portion, the large language model being an artificial intelligence model that uses one or more neural networks with a plurality of parameters, trained on one or more large data stores to understand, summarize, generate and predict responses;
- processing, at the large language model, the natural language formatted query, said processing comprising:
  - communicating with a large data store, and based on historical data stored at the large data store, formulating a natural language formatted response to the stock portion of the query; and
  - inserting one or more placeholders into the natural language formatted response for responses to the set of real-time conditions portion of the query;
- outputting, at the large language model, the natural language formatted response;
- receiving, at a dynamic, machine learning response application, the natural language formatted query and the natural language formatted response;
- processing, at the dynamic, machine learning response application, the natural language formatted query and the natural language formatted response, said processing comprising:

communicating with one or more private data stores, and based on real-time data stored at the one or more private data stores, formulating a real-time responsive element for each of the one or more placeholders included in the natural language formatted response; and inserting the real-time responsive element into each of the one or more placeholders included in the natural language formatted response;

outputting, at the dynamic, machine learning response application, a natural language formatted query response customized for the set of real-time conditions;

transmitting, at the dynamic, machine learning response application, the natural language formatted query response customized for the set of real-time conditions, to a responder; and responding, at the responder, with the natural language formatted query response customized for the set of real-time conditions.

2. The method of claim 1 wherein the method further comprises displaying the natural language formatted query response before or after the inserting.

3. The method of claim 1 wherein the processing, using the dynamic, machine learning response application, the natural language formatted query and the natural language formatted response comprises:

identifying a user account included in the set of real-time conditions; and retrieving user account information from the one or more private data stores.

4. The method of claim 3 wherein the one or more private data stores are continually updated in real-time.

5. The method of claim 1 wherein the large language model is trained on data from a large data store.

6. The method of claim 5 wherein the large data store is a fixed knowledge base that is updated periodically.

* * * * *